(12) United States Patent
Liao et al.

(10) Patent No.: US 11,216,543 B2
(45) Date of Patent: Jan. 4, 2022

(54) ONE-BUTTON POWER-ON PROCESSING METHOD AND TERMINAL THEREOF

(71) Applicant: SHENZHEN GOODIX TECHNOLOGY CO., LTD., Shenzhen (CN)

(72) Inventors: Xiaojun Liao, Shenzhen (CN); Bing Wang, Shenzhen (CN); Wenbin Sun, Shenzhen (CN); Xiaogang Qing, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/421,464

(22) Filed: May 23, 2019

(65) Prior Publication Data

US 2019/0278898 A1   Sep. 12, 2019

Related U.S. Application Data

(63) Continuation of application No. PCT/CN2017/081378, filed on Apr. 21, 2017.

(51) Int. Cl.
*G06F 21/00* (2013.01)
*G06F 21/32* (2013.01)
(Continued)

(52) U.S. Cl.
CPC ............. *G06F 21/32* (2013.01); *G06F 1/28* (2013.01); *G06F 21/81* (2013.01); *G06K 9/00013* (2013.01)

(58) Field of Classification Search
CPC ............ G06F 21/32; G06F 1/28; G06F 21/81; G06K 9/00013
See application file for complete search history.

(56) References Cited

U.S. PATENT DOCUMENTS 9,230,150 B1   1/2016 Merrell et al.
2007/0220273 A1*  9/2007 Campisi ............. G06Q 20/3574
                                                          713/186

(Continued)

FOREIGN PATENT DOCUMENTS

CN    102467629 A    5/2012
CN    203746071 U    7/2014
(Continued)

OTHER PUBLICATIONS

Eliot Graff et al. "Biometric Devices Design Guide," https://opdhsblobprod04.blob.core.windows.net/contents/e8076ea2fc0149e5a2cb281b153d2b9c/01cc1d430ecf196445-c5ae43f91307f8?sv=2015-04-05&sr=b&sig=dRI6oW3Xt%2BegF12fT3Cad%2BGYudeTFMN4oCmaP3myU%2BE%3D&st=2019-05-24T03%3A20%3A53Z&se=2019-05-25T03%3A30%3A53Z&sp=r, Apr. 20, 2017, 25 pages total.

*Primary Examiner* — Anthony D Brown
*Assistant Examiner* — Rodman Alexander Mahmoudi
(74) *Attorney, Agent, or Firm* — Brion Raffoul (57) ABSTRACT

A one-button power-on processing method and a terminal thereof are provided. The method includes: judging whether pressing a power button at a current time triggers one-button power-on of a terminal when it is detected that the power button is pressed at the current time; and sending the biometric feature data acquired by the biometric feature identification module to an operating system of the terminal for one-button power-on processing if pressing the power button at the current time triggers one-button power-on of the terminal. In this way, the terminal is powered on by a user by performing the press operation once. This enhances convenience, and effectively improves user experience of the terminal.

18 Claims, 7 Drawing Sheets

(51) Int. Cl.
  *G06F 1/28*  (2006.01)
  *G06F 21/81*  (2013.01)
  *G06K 9/00*  (2006.01)

(56) References Cited

U.S. PATENT DOCUMENTS

| | | | |
|---|---|---|---|
| 2013/0084831 A1* | 4/2013 | Suryanarayana | H04M 1/247 |
| | | | 455/411 |
| 2016/0196417 A1* | 7/2016 | Tokunaga | G06K 9/00288 |
| | | | 726/19 |
| 2016/0234204 A1* | 8/2016 | Rishi | H04L 63/0428 |
| 2016/0314291 A1 | 10/2016 | de Luna | |
| 2017/0090593 A1* | 3/2017 | Cao | G06F 3/0414 |
| 2017/0199650 A1* | 7/2017 | Sung | H04N 21/8166 |
| 2017/0277361 A1* | 9/2017 | Schulze | G06F 9/451 |
| 2019/0123907 A1* | 4/2019 | Kim | H04L 9/302 |

FOREIGN PATENT DOCUMENTS

| | | |
|---|---|---|
| CN | 204066118 U | 12/2014 |
| CN | 104834850 A | 8/2015 |
| CN | 105787325 A | 7/2016 |
| CN | 106127001 A | 11/2016 |
| CN | 205725904 U | 11/2016 |
| CN | 106292857 A | 1/2017 |
| CN | 106570373 A | 4/2017 |
| KR | 20070076317 A | 7/2007 |

* cited by examiner

ONE-BUTTON POWER-ON PROCESSING METHOD AND TERMINAL THEREOF

CROSS-REFERENCE TO RELATED APPLICATIONS

The present application is a continuation of international application No. PCT/CN2017/081378 filed on Apr. 21, 2017, which is hereby incorporated by reference in its entireties.

TECHNICAL FIELD

Embodiments of the present application relate to the technical field of electronics, and in particular, relate to a one-button power-on processing method and a terminal thereof.

BACKGROUND

With application of the fingerprint feature identification technology in mobile terminals, fingerprint-based authentication has replaced the traditional password-based authentication, gesture-based authentication and the like. In this way, the authentication does not need other operations, but may be conveniently implemented as long as a finger of a user is in contact with a sensor. This greatly improves use convenience of the electronic terminal while ensuring mobile terminal security, such that the fingerprint feature identification function is a standard configuration of the electronic terminals or even the traditional electronic products.

In this embodiment, using applying fingerprint feature identification a laptop computer as an example, a fingerprint is registered firstly by a fingerprint registration process; and after the fingerprint is successfully registered and the laptop computer is powered on and started, a fingerprint-based login option is displayed on a screen-lock and login interface of the operating system. A user swipes or presses a registered finger on a fingerprint feature identification module, screen-unlock or login may be practiced, such that the entire power-on process of the terminal is complete.

However, with respect to a scenario where system login is conventionally operated by the fingerprint technology, the fingerprint feature identification module is generally arranged at a lower position on the right side of the keyboard of the laptop computer. During use, the user needs to firstly press the power button to start the laptop computer, and then press the fingerprint feature identification module to log in. As a result, in the start process of the terminal, the user needs to perform at least two press operations, which reduces start efficiency of the terminal and degrades user experience.

SUMMARY

Embodiments of the present application are intended to provide a one-button power-on processing method and a terminal thereof, to at least solve the above technical problem in the related art.

Accordingly, embodiments of the present application provide a one-button power-on processing method. The method is applied to a terminal having a power button, where the terminal includes a biometric feature identification module configured to acquire biometric feature data of an operating subject when the operating subject presses the power button. The method includes:

judging whether pressing the power button at a current time triggers one-button power-on of the terminal when it is detected that the power button is pressed at the current time; and sending the biometric feature data acquired by the biometric feature identification module to an operating system of the terminal for one-button power-on processing if pressing the power button at the current time triggers one-button power-on of the terminal.

Embodiments of the present application further provide a terminal. The terminal includes a power button, a biometric feature identification module and a microprocessor. The biometric feature identification module is arranged on the power button and configured to acquire biometric feature data of an operating subject pressing the power button; the microprocessor is configured to judge whether pressing the power button at a current time triggers one-button power-on of the terminal when it is detected that the power button is pressed at the current time, and send the biometric feature data acquired by the biometric feature identification module to an operating system of the terminal for one-button power-on processing if pressing the power button at the current time triggers one-button power-on of the terminal.

In embodiments of the present application, when an operating subject presses a power button, a biometric feature identification module may acquire biometric feature data of the operating subject; when it is detected that the power button is pressed at a current time, whether pressing the power button at the current time triggers one-button power-on of a terminal is judged; and if pressing the power button at the current time triggers one-button power-on of the terminal, the biometric feature data acquired by the biometric feature identification module is sent to an operating system of the terminal for one-button power-on processing, such that the terminal is powered on by a user by performing the press operation once. This enhances convenience, and effectively improves user experience of the terminal.

DETAILED DESCRIPTION

Practice of the present application is described in detail with reference to drawings and specific embodiments, such that the practice of addressing the technical problem using the technical means according to the present application and achieving the technical effects may be better understood and conducted.

In the embodiments of the present application, when an operating subject presses a power button, a biometric feature identification module may acquire biometric feature data of the operating subject; when it is detected that the power button is pressed at a current time, whether pressing the power button at the current time triggers one-button power-on of a terminal is judged; and if pressing the power button at the current time triggers one-button power-on of the terminal, the biometric feature data acquired by the biometric feature identification module is sent to an operating system of the terminal for one-button power-on processing, such that the terminal is powered on by a user by performing the press operation once. This enhances convenience, and effectively improves user experience of the terminal.

In the embodiments of the present application hereinafter, by virtue of arrangement positions of the biometric feature identification module and the power button on the terminal, when the power button is pressed, the biometric feature identification module may meanwhile acquire the biometric feature data of the operating subject. For example, the biometric feature identification module is directly adhered to the power button or mounted to the power button in other fashions. The biometric feature identification module and the power button are arranged at the same position on the terminal, such that power-on and login of the terminal may be practiced by a user only by performing a press operation once. This process may be understood as one-button power-on. As such, it is unnecessary for the user to perform at least twice the press operation for respectively pressing the power button and the biometric feature identification module like the related art.

Figure 1:
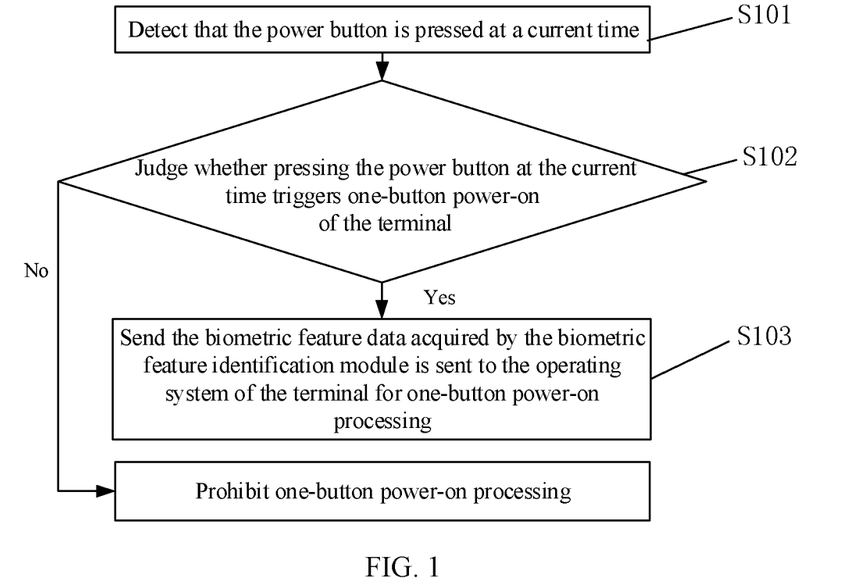
FIG. 1 is a schematic flowchart of a one-button power-on processing method according to a first embodiment of the present application.

FIG. 1 is a schematic flowchart of a one-button power-on processing method according to a first embodiment of the present application. As illustrated in FIG. 1, in this embodiment, the method is applied to a terminal having a power button, where the terminal includes a biometric feature identification module configured to acquire biometric feature data of an operating subject when the operating subject presses the power button. The method includes:

S101: It is detected that the power button is pressed at a current time.

In this embodiment, using applying on-button power-on to a laptop computer as an example, a fingerprint feature identification module is used as an example of the biometric feature identification module, and the power button and the fingerprint feature identification module are arranged at the same position of the laptop computer, such that when the power button is touched, the fingerprint feature identification module is touched at the same time. For example, at the position where the power button of a conventional laptop computer is arranged, the fingerprint feature identification module is adhered to an upper surface of the power button, to ensure practice of one-button power-on. Analogously, a similar solution may also be employed in design of the power button of a desktop computer, which is not described any further herein.

In this embodiment, in step S101, when it is detected that the power button is pressed at the current time, whether the power button is pressed at the current time may be detected based on monitoring of a pre-registered press event. For example, before the power button is pressed at the current time, a press event is pre-registered into the fingerprint feature identification module, such that when a finger directly presses the fingerprint feature identification module or directly presses the power button, the registered press even indicates that a finger makes a press action. However, it should be noted that detecting that the power button is pressed only by means of the pre-registered press event may also be practiced based on other hardware or a combination of hardware plus software.

S102: Whether pressing the power button at the current time triggers one-button power-on of the terminal is judged. If pressing the power button at the current time triggers one-button power-on of the terminal, step S103 is performed; and otherwise, one-button power-on is prohibited.

In this embodiment, with respect to judging whether pressing the power button at the current triggers one-button power-on of the terminal in step S102, whether a power-on electrical signal is enabled within a predefined time period may be judged, and it is determined that pressing the power button at the current time triggers one-button power-on of the terminal when the power-on electrical signal is enabled within the predefined time period.

In this embodiment, on a terminal equipped with a Windows operating system, the power-on electrical signal may be specifically an output signal of an embedded controller (EC). Whether a level of the output signal is pulled up within the predetermined time period is judged. For example, within a time period of 2 s, whether the level of the output signal of the embedded controller is pulled up. If the level of the output signal is pulled up, it is determined that the power-on electrical signal is enabled, and thus it is determined that pressing the power button at the current time triggers one-button power-on of the terminal; and otherwise, it is determined that pressing the power button at the current time does not trigger one-button power-on of the terminal.

In this embodiment, after one-button power-on is prohibited, the acquired biometric feature data may not be sent to the operating system of the terminal. For example, the system may display a prompt on a login interface of the terminal for re-acquisition of the biometric feature data. That is, the power button needs to be pressed again, such that the biometric feature identification module re-acquires the biometric feature data.

S103: The biometric feature data acquired by the biometric feature identification module is sent to the operating system of the terminal for one-button power-on processing.

In this embodiment, if the operating subject is a finger, the biometric feature data may be a fingerprint image; and if the operating subject is a palm, the biometric feature data may be a palmprint image. In other embodiments, the biometric feature data may be, for example, blood sample data or heart rate data. In specific practice, based on the detection needs of the actual biometric feature data, a corresponding biometric feature identification module may be arranged on the power button on the terminal, or the biometric feature identification module may also support acquisition and detection of more than two types of biometric feature data.

In this embodiment, in step S103, the biometric feature data acquired by the biometric feature identification module may be sent to the operating system of the terminal specifically based on a biometric feature data verification request. Presence of the verification request of the biometric feature data automatically triggers sending of the biometric feature data to the operating system, such that during power-on of the terminal, the operating system calls a biometric drive to match the biometric feature data, that is, data validity authentication. If the data validity authentication is applied to verification of a login permission of a laptop computer, whether the current user has an authorized permission to log in to and use the terminal is determined.

Figure 2:
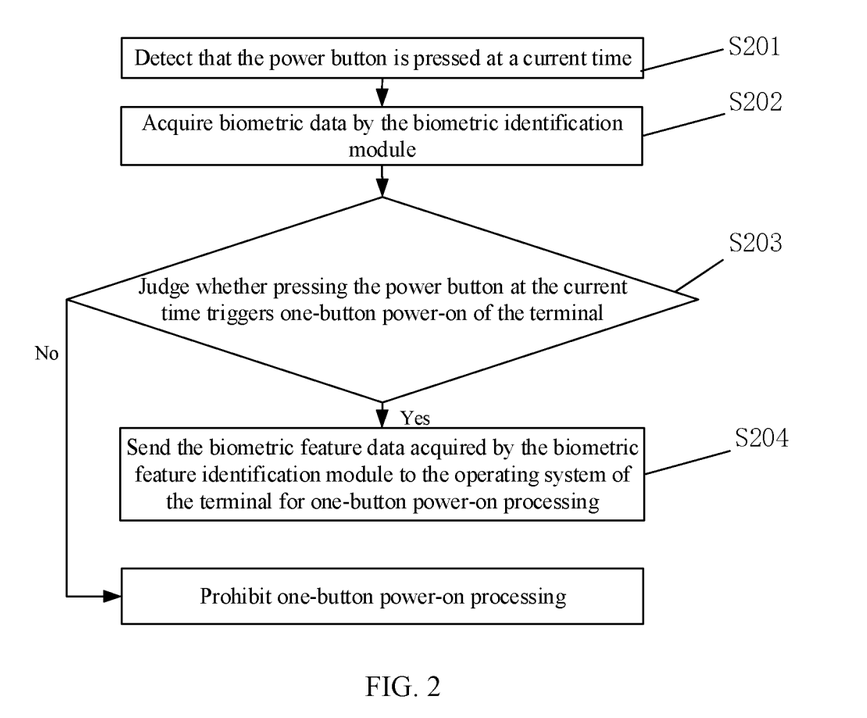
FIG. 2 is a schematic flowchart of a one-button power-on processing method according to a second embodiment of the present application.

FIG. 2 is a schematic flowchart of a one-button power-on processing method according to a second embodiment of the present application. As illustrated in FIG. 2, the method includes the following steps:

S201: It is detected that the power button is pressed at a current time.

In this embodiment, step S201 is similar to step S101 as illustrated in FIG. 1, which is not described herein any further.

S202: The biometric feature identification module acquires biometric feature data.

In this embodiment, when the biometric feature identification module acquires the biometric feature data in step S202, specifically the operating system of the terminal calls a biometric drive such that the biometric feature identification module acquires the biometric feature data. As described above, the biometric feature data may be a fingerprint image or blood sample data or heart rate data or the like.

However, different from the embodiment as illustrated in FIG. 1, in this embodiment, the step of acquiring the biometric feature data is added between step S201 and step S203. It should be noted that the acquired biometric feature data is temporarily stored such that the biometric feature data is subsequently sent to the operating system of the terminal.

S203: Whether pressing the power button at the current time triggers one-button power-on of the terminal is judged. If pressing the power button at the current time triggers one-button power-on of the terminal, step S204 is performed; and otherwise, one-button power-on is prohibited.

In this embodiment, step S203 is similar to step S102 in the embodiment as illustrated in FIG. 1. However, different from the above embodiment, in this embodiment, real-time acquisition of the biometric feature data is completed prior to judging whether one-button power-on of the terminal is triggered.

S204: The biometric feature data acquired by the biometric feature identification module is sent to the operating system of the terminal for one-button power-on processing.

In this embodiment, as described above, since the biometric feature data is acquired and temporarily stored between detecting that the power button is pressed and judging whether one-button power-on of the terminal is triggered, in this embodiment, when the biometric feature data acquired by the biometric feature identification module is sent to the operating system of the terminal, the stored biometric feature data may be directly pulled and then sent to the operating system of the terminal. Specifically, pulling of the biometric feature data to the operating system of the terminal is started by an interruption.

Based on the embodiment as illustrated in FIG. 2, the method may further include: if pressing the power button at the current time does not trigger one-button power-on of the terminal, one-button power-on processing is prohibited, and the biometric feature data acquired by the biometric feature identification module when the power button is pressed at the current time is discarded.

Figure 3:
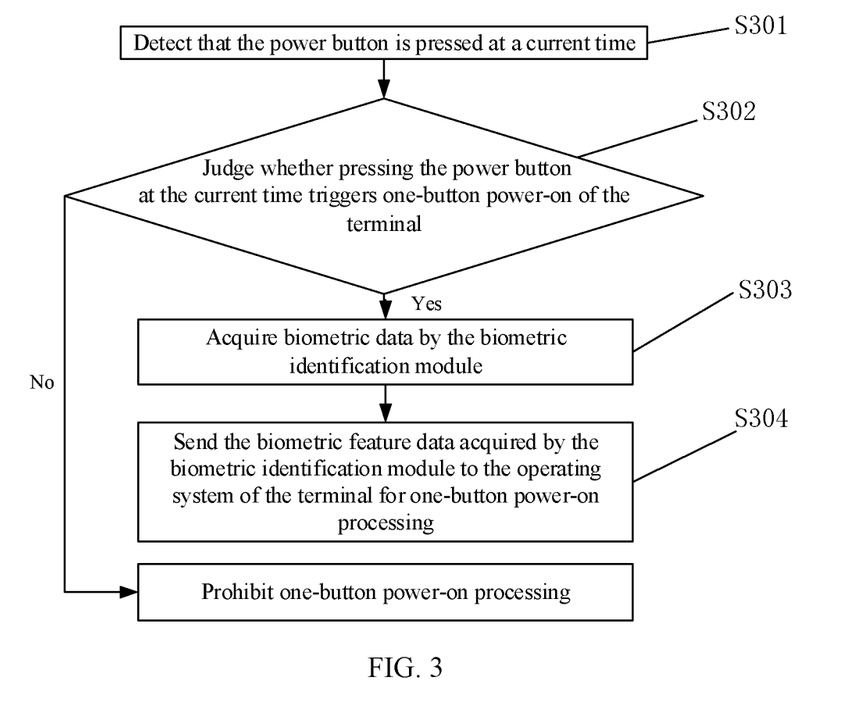
FIG. 3 is a schematic flowchart of a one-button power-on processing method according to a third embodiment of the present application.

FIG. 3 is a schematic flowchart of a one-button power-on processing method according to a third embodiment of the present application. As illustrated in FIG. 3, the method includes the following steps.

S301: It is detected that the power button is pressed at a current time.

S302: Whether pressing the power button at the current time triggers one-button power-on of the terminal is judged. If pressing the power button at the current time triggers one-button power-on of the terminal, step S303 is performed; and otherwise, one-button power-on is prohibited.

S303: The biometric feature identification module acquires biometric feature data.

S304: The biometric feature data acquired by the biometric feature identification module is sent to the operating system of the terminal for one-button power-on processing.

Different from the embodiment as illustrated in FIG. 2, in this embodiment, the biometric feature data is acquired after it is determined that pressing the power button at the current time triggers one-button power-on of the terminal. Therefore, the acquired biometric feature data may not be temporarily stored, but may be directly sent to the operating system of the terminal in step S304. In this way, time efficiency of data processing is improved.

Based on the embodiment as illustrated in FIG. 3, if it is determined that pressing the power button at the current time does not trigger one-button power-on of the terminal, one-button power-on processing may be prohibited, and meanwhile, step S303 and step S304 may not be performed.

Figure 4:
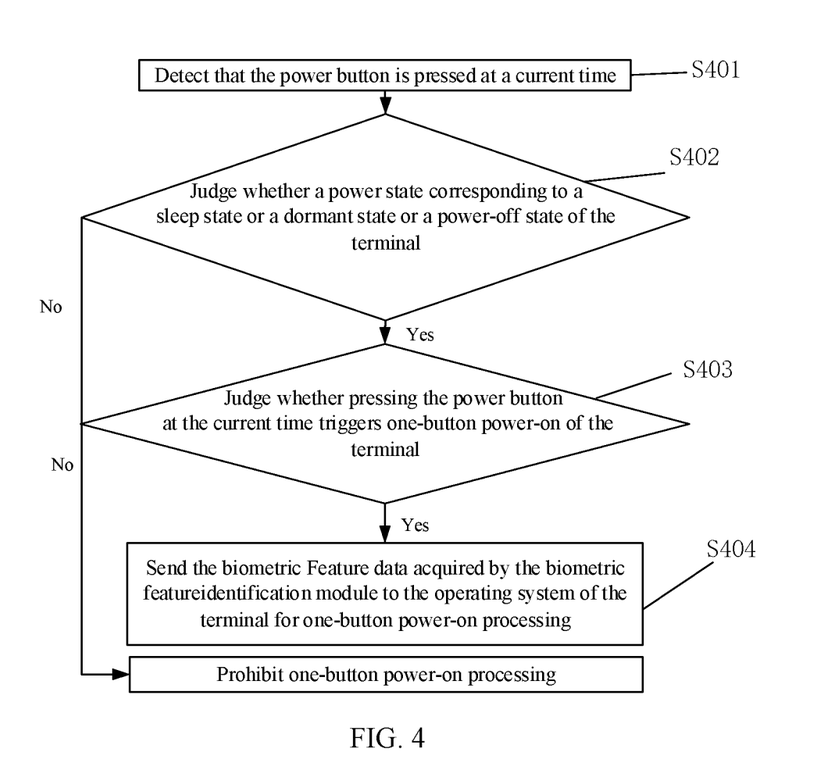
FIG. 4 is a schematic flowchart of a one-button power-on processing method according to a fourth embodiment of the present application.

FIG. 4 is a schematic flowchart of a one-button power-on processing method according to a fourth embodiment of the present application. As illustrated in FIG. 4, the method includes the following steps.

S401: It is detected that the power button is pressed at a current time.

In this embodiment, step S401 is similar to step S101 as illustrated in FIG. 1, which is not described herein any further.

S402: Whether a power state corresponding to a sleep state or a dormant state or a power-off state of the terminal is present is judged. If such a power state is present, step S403 is performed; and otherwise, one-button power-on processing is prohibited.

In this embodiment, if the terminal is in the sleep state, the power state of the terminal is represented by S3; if the terminal is in the dormant state, the power state of the terminal is represented by S4; and if the terminal is in the power-off state, the power state of the terminal is represented by S5. Using a laptop computer as an example, if the laptop computer enters the sleep state, the hard disk is disabled, the memory is active, the state of the operating system is stored in the memory, and the power source constantly supplies power for the memory; if the laptop computer enters the dormant state, the operating system stores all the data in the memory to the hard disk, and in this case, the power source supplies power for the hard disk, and subsequently stops supplying power for the memory, the hard disk and the CPU; and if the laptop computer enters the power-off state, the power source directly stops supplying power for the CPU, the memory and the hard disk.

In this embodiment, prior to the current time, after the power button is pressed or the terminal is made to enter the sleep state or the dormant state or the power-off state, when it is detected that the power button is pressed at the current time in step S401, it is preliminarily determined that pressing the power button at the current time cause the terminal to resume from the sleep state or the dormant state or the power-off state and enter one-button power-on processing. Accordingly, in this embodiment, after the power button is pressed at the current time such that the terminal enters the sleep state or the dormant state or the power-off state, the corresponding power state is stored, such that whether one-button power-on is triggered is preliminarily judged when it is detected that the power button is pressed.

Further, if it is determined that the power state corresponding to the sleep state or the dormant state or the power-off state of the terminal is not present, pressing the power button at the current time is a mis-operation, and one-button power-on processing is not needed. In this case, one-button power-on processing may be directly prohibited.

In addition, whether to store the power state corresponding to the sleep state or the dormant state or the power-off state of the terminal when the power button is pressed prior to the current time may be defined on the terminal. If it is defined on the terminal that the power state needs to be stored, one-button power-on processing may be performed if a judgment result in step S403 indicates that pressing the power button at the current time triggers one-button power-on of the terminal, and otherwise, one-button power-on processing does not need to be performed when the power button is pressed. In other words, by storing the power state corresponding to the sleep state or the dormant state or the power-off state of the terminal, whether to implement the one-button power-on processing function may be customized.

S403: Whether pressing the power button at the current time triggers one-button power-on of the terminal is judged. If pressing the power button at the current time triggers one-button power-on of the terminal, step S404 is performed; and otherwise, one-button power-on is prohibited.

In this embodiment, as described above, whether one-button power-on of the terminal is triggered may be judged by judging whether a power-on electrical signal is enabled.

Further, whether pressing the power button at the current time triggers one-button power-on of the terminal may be judged by enabling a power-off electrical signal of the operating system. If the power-off electrical signal is enabled, whether pressing the power button at the current time triggers one-button power-on of the terminal may be indirectly judged, and one-button power-on processing may be directly prohibited. If the power-off electrical signal is not enabled, whether one-button power-on of the terminal is triggered may be judged based on whether the power-on electrical signal according to the first embodiment is enabled.

S404: The biometric feature data acquired by the biometric feature identification module is sent to the operating system of the terminal for one-button power-on processing.

In this embodiment, steps S404 may be referenced to the disclosure in the above embodiments, which is not described herein any further.

In this embodiment, the step of judging whether the power state corresponding to the sleep state or the dormant state or the power-off state is present is added between detecting that the power button is pressed at the current time and judging whether one-button power-on processing is triggered. That is, whether the one-button power-on processing function is customized for the terminal is judged firstly, and then whether a trigger condition of one-button power-on processing is satisfied is judged. If the one-button power-on processing function is customized and the trigger condition is satisfied, step S404 is performed; and otherwise, one-button power-on processing is prohibited.

Figure 5:
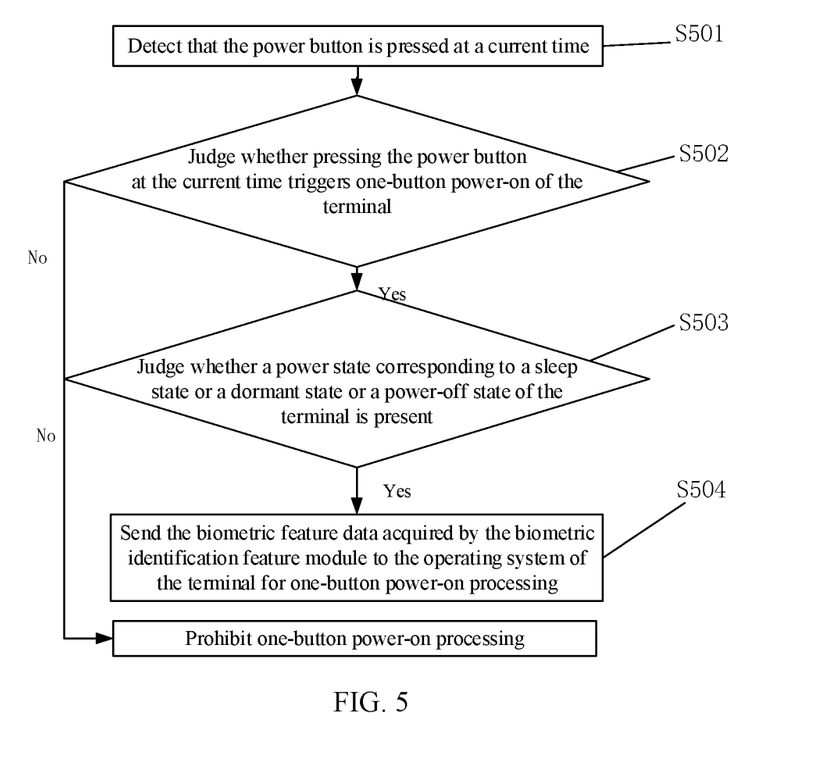
FIG. 5 is a schematic flowchart of a one-button power-on processing method according to a fifth embodiment of the present application.

FIG. 5 is a schematic flowchart of a one-button power-on processing method according to a fifth embodiment of the present application. As illustrated in FIG. 5, the method includes the following steps.

S501: It is detected that the power button is pressed at a current time.

S502: Whether pressing the power button at the current time triggers one-button power-on of the terminal is judged. If pressing the power button at the current time triggers one-button power-on of the terminal, step S503 is performed; and otherwise, one-button power-on is prohibited.

S503: Whether a power state corresponding to a sleep state or a dormant state or a power-off state of the terminal is present is judged. If such a power state is present, step S504 is performed; and otherwise, one-button power-on processing is prohibited.

S504: The biometric feature data acquired by the biometric feature identification module is sent to the operating system of the terminal for one-button power-on processing.

Different from the embodiment as illustrated in FIG. 4, in this embodiment, the step of judging the power state corresponding to the sleep state or the dormant state or the power-off state is present is added between judging whether one-button power-on is triggered and sending the biometric feature data. As described above, that is, whether a trigger condition of one-button power-on is satisfied is judged firstly, and then whether the one-button power-on processing function is customized is judged.

Referring to the embodiments as illustrated FIG. 2 and FIG. 3, if the step of acquiring the biometric feature data is added in the embodiments as illustrated in FIG. 4 and FIG. 5, based on the embodiments as illustrated in FIG. 4 and FIG. 5, the one-button power-on processing method may further include: discarding the biometric feature data acquired by the biometric feature identification module while prohibiting one-button power-on processing if the power state corresponding to the sleep state or the dormant state or the power-off state of the terminal is not present.

It should be noted that in the above method embodiments, if the operating system is not started, the operating system of the terminal needs to be started, and then the biometric feature data acquired by the biometric feature identification module is sent to the operating system of the terminal for one-button power-on processing.

Figure 6:
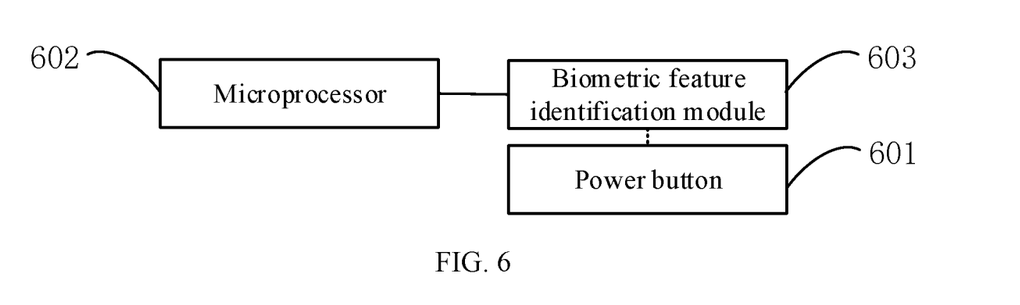
FIG. 6 is a schematic structural diagram of a terminal according to a sixth embodiment of the present application.

FIG. 6 is a schematic structural diagram of a terminal according to a sixth embodiment of the present application. As illustrated in FIG. 6, the terminal includes a power button 601, a microprocessor 602 and a biometric feature identification module 603. The biometric feature identification module 603 is, for example, arranged on the power button 601. The biometric feature identification module 603 is configured to acquire biometric feature data of an operating subject pressing the power button. The microprocessor 602 is configured to judge whether pressing the power button 601 at a current time triggers one-button power-on of the terminal when the biometric feature identification module 603 detects that the power button 601 is pressed at the current time, and send the biometric feature data acquired by the biometric feature identification module 603 to an operating system of the terminal for on-button power-on processing if pressing the power button at the current time triggers one-button power-on of the terminal. In this embodiment, the microprocessor 602 and the biometric feature identification module 603 communicate with each other via a serial peripheral interface (SPI), or communicate with each other via a universal serial bus (USB).

In this embodiment or any other embodiment, the microprocessor 602 is further configured to determine that pressing the power button 601 at the current time triggers one-button power-on of the terminal when a power-on electrical signal is enabled within a predefined time period.

In this embodiment or any other embodiment, the microprocessor 602 is further configured to send the biometric feature data acquired by the biometric feature identification module 603 to the operating system of the terminal based on a biometric feature data verification request.

In this embodiment or any other embodiment, the microprocessor 602 is further configured to enable the biometric feature identification module 603 to acquire the biometric feature data.

In this embodiment or any other embodiment, the operating system of the terminal is configured to call a biometric drive such that the biometric feature identification module 603 acquires the biometric feature data.

In this embodiment or any other embodiment, the biometric drive is configured to pull the biometric feature data stored in the microprocessor 602 and send the biometric feature data to the operating system of the terminal.

In this embodiment or any other embodiment, the biometric drive is configured to notify, by an interruption, the microprocessor 602 such that the stored biometric feature data stored is pulled from the microprocessor 602.

In this embodiment or any other embodiment, the microprocessor is further configured to: discarding the biometric feature data acquired by the biometric feature identification module 603 when the power button 601 is pressed at the current time if the pressing the power button 601 at the current time does not trigger on-button power-on of the terminal.

In this embodiment or any other embodiment, the microprocessor 602 is further configured to: prior to the judging whether pressing the power button 601 at a current time triggers one-button power-on of the terminal, judge whether a power state corresponding to a sleep state or a dormant state or a power-off state of the terminal is present; and judge whether the pressing the power button 601 at the current time triggers one-button power-on of the terminal if such a power state is present; or the microprocessor 602 is further configured to: upon the judging whether pressing the power button at a current time triggers one-button power-on of the terminal, judge whether a power state corresponding to a sleep state or a dormant state or a power-off state of the terminal is present; and send the biometric feature data acquired by the biometric feature identification module 603 to the operating system of the terminal if such a power state is present.

In this embodiment or any other embodiment, the microprocessor 602 is further configured to discard the biometric feature data acquired by the biometric feature identification module 603 if the power state corresponding to the sleep state or the dormant state or the power-off state of the terminal is not present.

In this embodiment, the biometric feature identification module 603 may be practiced based on the light transmission principle or based on the capacitance effect principle. In a fingerprint feature module based on the light transmission principle, fingerprint feature data is generated based on differences of reflection degrees for the light by ridges and valleys of the fingerprint. In a fingerprint feature module based on the capacitance effect principle, fingerprint feature data is generated based on different capacitors defined by projection and indention of ridges and valleys of the fingerprint.

Hereinafter, with specific application examples, scenarios where the above method and operating system embodiments practice one-button power-on based on fingerprints on a laptop computer are described. For clear interpretation, specific practice of one-button power-on a product is exemplarily described by two stages: a pre-processing stage of one-button power-on and a login stage of one-button power-on.

Figure 7:
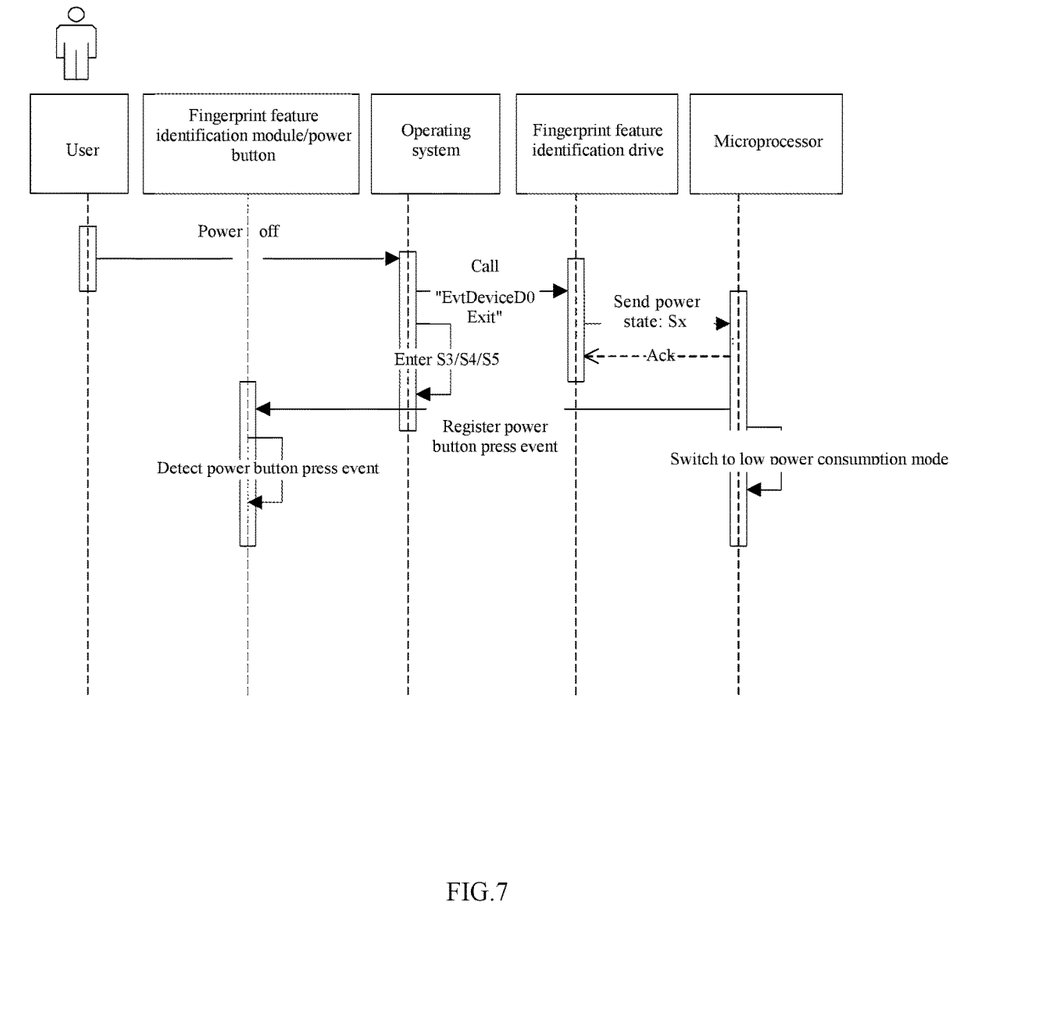
FIG. 7 is a schematic flowchart of a pre-processing stage of one-button power-on according to a seventh embodiment of the present application.

FIG. 7 is a schematic flowchart of a pre-processing stage of one-button power-on according to a seventh embodiment of the present application. That is, a series of processes during the course where the laptop computer enters the sleep state or the dormant state or the power-off state, as illustrated in FIG. 7, include the following steps.

(1) A user presses a power button/a fingerprint feature identification apparatus, and a power off even is generated, such that the laptop computer enters the sleep state or the dormant state or the power-off state, and the corresponding power state is S3, S4 or S5 (enter S3/S4/S5).

(2) A fingerprint feature identification drive registers an EvtDevice0Exit event recall function, and the operating system (OS) of the laptop computer calls EvtDeviceD0Exit and calls the WdfDeviceGetSystemPowerAction function in the EvtDeviceD0Exit event recall function, such that the corresponding power state Sx (S3 or S4 or S5) of the terminal is acquired.

(3) The fingerprint feature identification drive sends the power state to a microprocessor for storage (send power state Sx).

(4) The microprocessor registers a power button press event to the fingerprint feature identification module, such that the fingerprint feature identification module detects in real time the power button press event, to detect whether the power button is pressed.

(5) The microprocessor enters a low power consumption mode (switch low power mode), for example, a sleep mode.

Based on the processes as illustrated in FIG. 7, when the laptop computer enters the sleep state or the dormant state or the power-off state, the power state corresponding to the sleep state, the dormant state or the power-off state is stored. In addition, a fashion of registering the power button press event is provided, to detect occurrence that the power button is pressed again.

Figure 8:
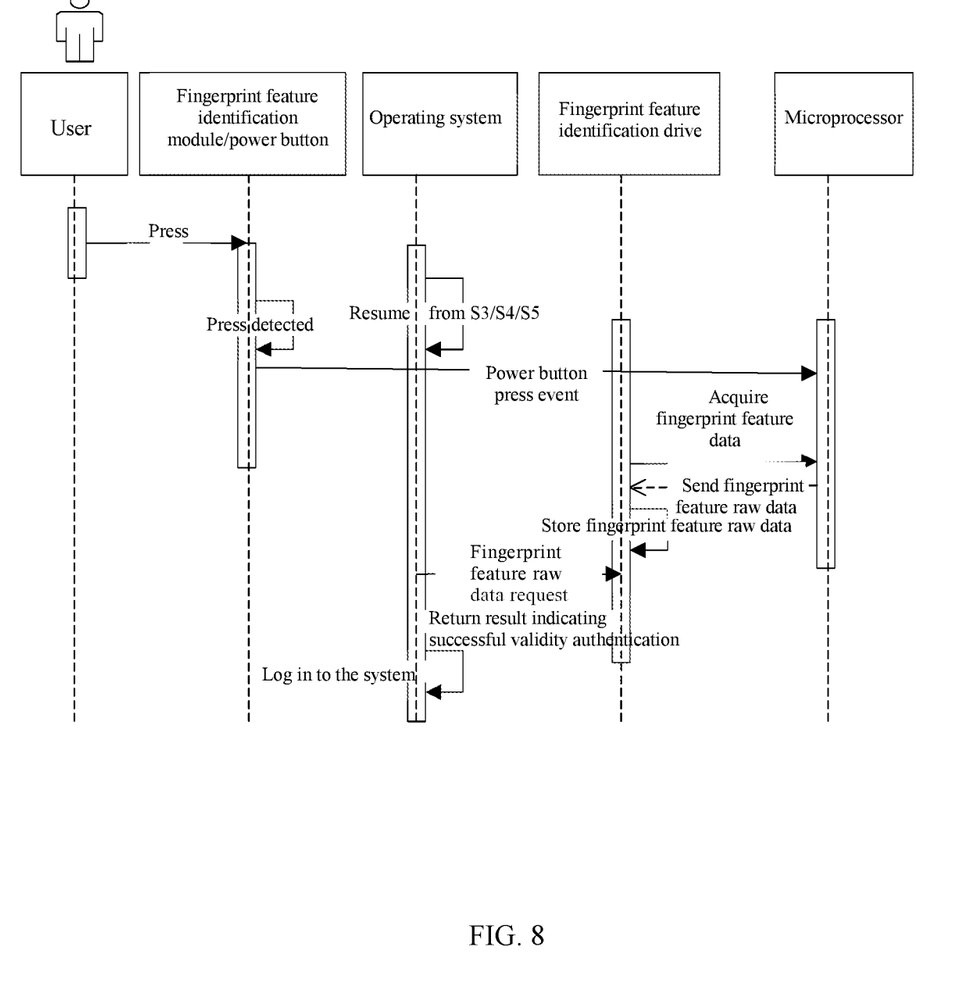
FIG. 8 is a schematic flowchart of a login stage of one-button power on according to an eighth embodiment of the present application.

FIG. 8 is a schematic flowchart of a login stage of one-button power on according to an eighth embodiment of the present application. As illustrated in FIG. 8, the login stage includes the following steps.

(1) A user presses a power button/a fingerprint feature identification module at a current time, and a power on event is generated to enter a waken-up state (resume from S3/S4/S5).

Since in the pre-processing in FIG. 7, the microprocessor registers the power button press event to the fingerprint feature identification module, the fingerprint feature identification module detects that the power button is pressed (detected finger-down).

(2) The fingerprint feature identification module notifies the microprocessor (or microcontroller unit, MCU) that it is detected that the power button is pressed, and wakes up the microprocessor in the sleep state.

(3) The microprocessor controls the fingerprint feature identification module to acquire the fingerprint feature data, for example, a frame of fingerprint feature data, and acquires and stores the acquired fingerprint feature data.

(4) The microprocessor judges whether pressing the power button at the current time triggers one-button power-on of the terminal.

The fingerprint feature identification module (5) and the fingerprint feature identification drive acquire the stored fingerprint feature data, for example, the finger image from the microprocessor (query Fingerprint image).

(5) The microprocessor sends the stored fingerprint feature data to the fingerprint feature identification drive (send Fingerprint image) such that the fingerprint feature identification drive stores the fingerprint feature data (save Fingerprint image).

Since the fingerprint feature identification drive registers the EvtDevice0Entry recall function, upon resuming from the power state S3/S4/S5, the operating system may call the EvtDeviceD0Entry function for one time. By the EvtDeviceD0Entry function, the fingerprint feature identification drive may be in communication with the microprocessor. The microprocessor queries whether the fingerprint feature data is stored, and sends the queried fingerprint feature data to the fingerprint feature identification drive.

(6) The operating system (OS) sends a fingerprint feature data request to the fingerprint feature identification drive (send capture request).

For example, the fingerprint feature data request is sent via IOCTL_BIOMETRIC_CAPTURE_DAT.

(7) The fingerprint feature identification drive makes a response to the sent fingerprint feature data request, and sends the fingerprint feature data to the operating system of the terminal after the operating system of the terminal is started.

(8) The operating system of the terminal calls a matching engine (engine adapter) to match the fingerprint feature data.

(9) The matching engine returns a result of validity authentication (complete capture request with Fingerprint image) to the operating system.

(10) Login of the laptop computer is complete.

As described above, in another specific implementation scenario, whether a validity authentication trigger condition is defined is judged firstly. If the validity authentication trigger condition is defined, the fingerprint feature data is acquired, and then the fingerprint feature data is stored and acquired, which is not described herein any further.

Figure 9:
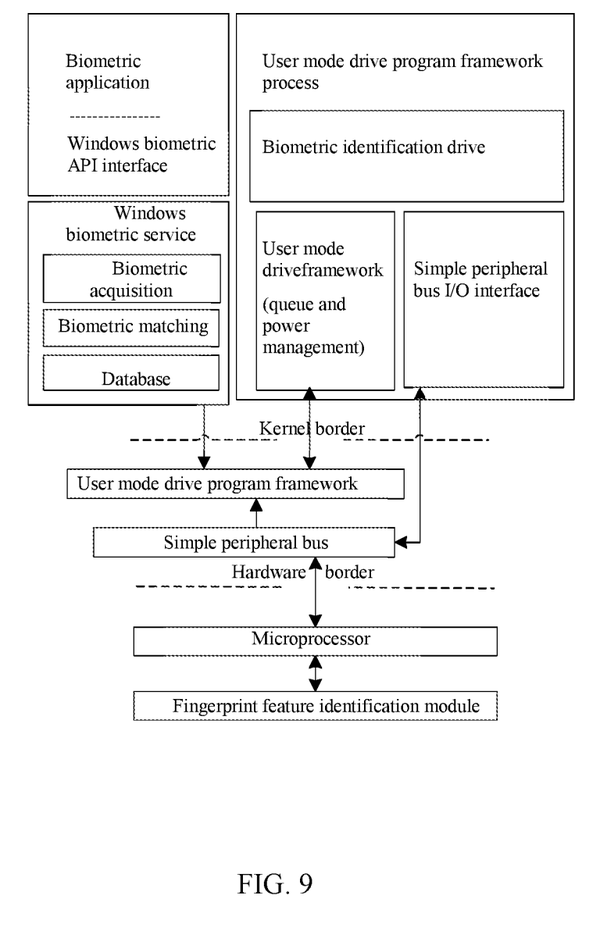
FIG. 9 is a schematic diagram of software architecture according to a ninth embodiment of the present application.

FIG. 9 is a schematic diagram of software architecture according to a ninth embodiment of the present application. As illustrated in FIG. 1, in this embodiment, the architecture in the technical solutions according to the above embodiments are practiced on Windows 10. From the perspective of hardware, the architecture includes the above described biometric identification apparatus and microprocessor. From the perspective of Windows software, the architecture includes: a biometric application, a Windows biometric API interface, a Windows biometric service, and a user mode drive program framework process (WUDFhost.exe). The biometric application involves login based on fingerprint feature data. The Windows biometric service involves biometric acquisition (finger sensor), and biometric matching (engine adapter), a storage database of biometric feature data. The user mode drive program framework process includes a biometric identification drive (for example, a fingerprint device drive), a user mode drive framework (wudf framework support), a simple peripheral bus I/O interface (SPB I/O target), and a simple peripheral bus (SPB). The simple peripheral bus I/O interface may be used for interaction between the microprocessor and the biometric identification drive based on a serial peripheral interface (SPI).

It should be noted that, for fulfillment of the objectives of the present application, a fingerprint feature identification drive (fingerprint device drive) is added in the user mode drive program framework process, and fingerprint feature matching (engine adapter) is added in the Windows biometric service.

The above described apparatus embodiments are merely for illustration purpose only. The modules which are described as separate components may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments. Persons of ordinary skill in the art may understand and implement the present application without paying any creative effort.

According to the above embodiments of the present application, a person skilled in the art may clearly understand that the embodiments of the present application may be implemented by means of hardware or by means of software plus a necessary general hardware platform. Based on such understanding, portions of the technical solutions of the present application that essentially contribute to the related art may be embodied in the form of a software product, the computer software product may be stored in a computer readable storage medium. The computer-readable storage medium includes any mechanism for storing or transferring information in a computer readable form. For example, the computer-readable medium includes a read-only memory (ROM), a random access memory (RAM), a disk storage medium, an optical storage medium, a flash storage medium, electricity, light, sound and other forms of propagation signals (for example, a carrier, an infrared signal, a digital signal and the like), and the like. The computer software product includes several instructions for instructing a computer device (which may be a personal computer, a server, or a network device) to perform all the embodiments or some parts of the embodiments.

The present application is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a computer-readable memory capable of causing a computer or other programmable data processing devices to work in a specific mode, such that the instructions stored on the computer-readable memory implement a product including an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A one-press power-on processing method, the method being applied to a terminal with a power button, the terminal comprising a biometric feature identification module and a microprocessor, wherein the microprocessor and the biometric feature identification module are configured to communicate with each other via a serial peripheral interface, and the biometric feature identification module is configured to acquire biometric feature data of an operating subject when the operating subject presses the power button; the method comprising:

in a pre-processing stage of one-button power-on, performing, by the microprocessor, operations of:
when the operating subject presses the power button such that the terminal enters a sleep state, a dormant state or a power-off state, receiving a power state corresponding to the sleep state, the dormant state or the power-off state of an operating system of the terminal from a fingerprint feature identification drive of the terminal, and storing the power state;
registering a power button press event in the biometric feature identification module such that the biometric feature identification module detects the power button press event to determine whether the power button is pressed; and entering a low power consumption mode after registering the power button press event in the biometric feature identification module;

in a login stage of one-button power-on:
notifying, by the biometric feature identification module, the microprocessor by way of interruption that the pressing of the power button has been detected, and waking up the microprocessor when it is detected that the power button is pressed at a current time;
controlling, by the microprocessor, the biometric feature identification module to acquire the fingerprint feature data, and acquiring the fingerprint feature data acquired by the biometric feature identification module;
detecting, by the microprocessor, whether the power state corresponding to the sleep state, dormant state or power-off state of the terminal is stored, and determining whether the pressing of the power button at the current time triggers one-press power-on operation of the terminal when it is detected that the power state corresponding to the sleep state, dormant state or power-off state of the terminal is stored; and
sending, by the microprocessor, the biometric feature data acquired by the biometric feature identification module to an operating system of the terminal for one-press power-on processing when the pressing of the power button at the current time triggers the one-press power-on operation of the terminal for the one-press power-on processing;

wherein the biometric feature identification module is a fingerprint feature identification module, and the biometric feature data comprises a fingerprint image.

2. The method according to claim 1, wherein the sending, by the microprocessor, the biometric feature data acquired by the biometric feature identification module to an operating system of the terminal comprises:
sending, by the microprocessor, the biometric feature data acquired by the biometric feature identification module to the operating system of the terminal based on a biometric feature data verification request.

3. The method according to claim 1, further comprising:
acquiring, by the microprocessor, the biometric feature data by the biometric feature identification module upon detecting that the power button is pressed at the current time and prior to the determining whether pressing the power button at the current time triggers one-press power-on of the terminal; or
acquiring, by the microprocessor, the biometric feature data by the biometric feature identification module upon determining that pressing the power button at the current time triggers one-press power-on of the terminal and prior to the sending the biometric feature data to the operating system of the terminal.

4. The method according to claim 3, wherein the biometric feature data is acquired by the biometric feature identification module comprises:
calling, by the operating system of the terminal, the biometric feature identification drive such that the biometric feature identification module acquires the biometric feature data.

5. The method according to claim 1, further comprising storing, by the microprocessor, the acquired biometric feature data, wherein the sending, by the microprocessor, the biometric feature data acquired by the biometric feature identification module to an operating system of the terminal comprises: pulling the stored biometric feature data and sending the biometric feature data to the operating system of the terminal.

6. The method according to claim 1, further comprising:
discarding, by the microprocessor, the biometric feature data acquired by the biometric feature identification module when the power button is pressed at the current time if the pressing of the power button at the current time does not trigger one-press power-on of the terminal.

7. The method according to claim 1, further comprising:
discarding the biometric feature data acquired by the biometric feature identification module if the power state corresponding to the sleep state, the dormant state or the power-off state of the operating system of the terminal is not stored.

8. The method according to claim 1, the power button and the biometric feature identification module are combined together and arranged at the same position of the terminal.

9. The method according to claim 1, further comprising:
waiting, by the microprocessor, for startup of the operating system of the terminal; and
sending, by the microprocessor, the biometric feature data acquired by the biometric feature identification module to the operating system of the terminal for one-press power-on processing upon startup of the operating system.

10. A terminal, comprising:
a power button;
a biometric feature identification module arranged on the power button and configured to acquire biometric feature data of an operating subject when the operating subject presses the power button; and
a microprocessor configured to communicate with the biometric feature identification module via a serial peripheral interface,
wherein the microprocessor is configured to:
in a pre-processing stage of one-button power-on, when the operating subject presses the power button such that the terminal enters a sleep state, dormant state or power-off state, receive a power state corresponding to the sleep state, the dormant state or the power-off state of an operating system of the terminal from a fingerprint feature identification drive of the terminal, and store the power state; register a power button press event in the biometric feature identification module such that the biometric feature identification module detects the power button press event to determine whether the power button is pressed; and enter a low power consumption mode after registering the power button press event in the biometric feature identification module;
the biometric feature identification module being further configured to:
in a login stage of one-button power-on, notify the microprocessor by way of interruption that the pressing of the power button has been detected, and waking up the microprocessor when it is detected that the power button is pressed at a current time;
the microprocessor being further configured to:
in a login stage of one-button power-on, control the biometric feature identification module to acquire the fingerprint feature data, and acquire the fingerprint feature data acquired by the biometric feature identification module; and detect whether the power state corresponding to the sleep state or the dormant state or the power-off state of the operating system of the terminal is stored, and determine whether the pressing of the power button at the current time triggers one-press power-on operation of the terminal when it is detected that the power state corresponding to the sleep state, dormant state or power-off state of the terminal is stored; and send the biometric feature data acquired by the biometric feature identification module to an operating system of the terminal for one-press power-on processing when the pressing of the power button at the current time triggers the one-press power-on operation of the terminal for one-press power-on processing;
wherein the biometric feature identification module is a fingerprint feature identification module, and the biometric feature data comprises a fingerprint image.

11. The terminal according to claim 10, wherein the microprocessor is further configured to send the biometric feature data acquired by the biometric feature identification module to the operating system of the terminal based on a biometric feature data verification request.

12. The terminal according to claim 10, wherein the microprocessor is further configured to enable the biometric feature identification module to acquire the biometric feature data.

13. The terminal according to claim 12, wherein the operating system of the terminal is configured to call a biometric drive such that the biometric feature identification module acquires the biometric feature data.

14. The terminal according to claim 13, wherein the biometric feature data is stored in the microprocessor and the biometric drive is configured to pull the biometric feature data stored in the microprocessor and send the biometric feature data to the operating system of the terminal.

15. The terminal according to claim 10, wherein the microprocessor is further configured to: discarding the biometric feature data acquired by the biometric feature identification module when the power button is pressed at the current time if pressing the power button at the current time does not trigger on-button power-on of the terminal.

16. The terminal according to claim 7, wherein the microprocessor is further configured to discard the biometric feature data acquired by the biometric feature identification module if the power state corresponding to the sleep state, the dormant state or the power-off state of the operating system of the terminal is not stored.

17. The method according to claim 1, wherein the determining whether the pressing of the power button at the current time triggers one-press power-on operation of the terminal comprises: determining that pressing of the power button at the current time triggers one-press power-on operation of the terminal when a power-on electrical signal is enabled within a predefined time period.

18. The terminal according to claim 10, wherein the microprocessor is further configured to determine that the pressing of the power button at the current time triggers one-press power-on operation of the terminal when a power-on electrical signal is enabled within a predefined time period.

* * * * *